Patented Feb. 8, 1949

2,461,340

UNITED STATES PATENT OFFICE 2,461,340

POLYALKYLATED CYCLIC SULFONE HALOHYDRINS

Rupert C. Morris, Berkeley, and John L. Van Winkle, San Lorenzo, Calif., assignors to Shell Development Company, San Francisco, Calif., a corporation of Delaware No Drawing. Application January 22, 1946, Serial No. 642,742

3 Claims. (Cl. 260—329)

This invention relates to halogenated hydroxy polyalkylated cyclic sulfones. More particularly, the invention pertains to polyalkylsulfolanyl and polyalkylsulfolenyl halohydrins. A particularly valuable group of compounds comprises the 2,4-dialkylsulfolanyl halohydrins and the 2,4-dialkylsulfolenyl halohydrins.

The term "sulfolane" refers to the compound having a nucleus consisting of four saturated carbon atoms and one sulfur atom, the sulfur atom being linked to two oxygen atoms and comprising a sulfonyl group, and the free bonds of the nuclear carbon atoms being directly attached to hydrogen atoms. The derivative expression "sulfolanyl" refers to compounds derived from sulfolane by replacing one or more of the hydrogen atoms linked to the nuclear carbon atoms with an equivalent number of other groups or radicals. The term "sulfolene" also refers to compounds having a nucleus made up of four carbon atoms and a sulfonyl group, with the free bonds of the nuclear carbon atoms being directly attached to hydrogen atoms, but here a double bond exists between two of the carbon atoms in the nucleus, the position of said double bond being indicated when naming each particular compound. The term "sulfolenyl" is derived from "sulfolene" and refers to those compounds wherein one or more of the hydrogen atoms attached to the sulfolene nuclear carbon atoms are replaced by a corresponding number of other groups or radicals.

The halogenated hydroxy compounds of the invention contain a five-membered heterocyclic nucleus consisting of four nuclear carbon atoms and a sulfonyl radical and having at least two alkyl radicals directly attached to one or more of the nuclear carbon atoms, having at least one of the nuclear carbon atoms directly attached to a halogen atom and having at least one of the nuclear carbon atoms directly attached to the hydroxy radical.

The novel halogenated hydroxy polyalkylsulfolanyl compounds contain a five-membered heterocyclic ring consisting of four saturated nuclear carbon atoms and one sulfonyl radical, having at least two alkyl radicals directly attached to one or more of the nuclear carbon atoms, wherein at least one of the nuclear carbon atoms is directly attached to a halogen atom and at least one of the nuclear carbon atoms is directly attached to the hydroxy radical, the remaining free bonds of the nuclear carbon atoms being directly attached to members of the group consisting of the hydrogen atom and the organic radicals. The polyalkylsulfolanyl halogenated hydroxy compounds may be represented by the formula

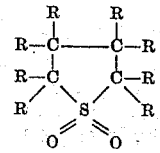

wherein at least one of the R's is a halogen atom, at least one of the R's is a hydroxy radical, at least two of the R's are alkyl radicals, and the remaining R's are members of the group consisting of the hydrogen atom, the hydrocarbon radicals and the substituted hydrocarbon radicals.

The halogenated hydroxy polyalkylsulfolenyl compounds of the invention contain a five-membered heterocyclic ring consisting of four nuclear carbon atoms and a sulfonyl radical and having a double bond between two vicinal nuclear carbon atoms, wherein at least two alkyl groups are directly attached to one or more of the nuclear carbon atoms, and wherein at least one of the nuclear carbon atoms is directly attached to a halogen atom and at least one of the nuclear carbon atoms is directly attached to the hydroxy radical. The halogenated hydroxy polyalkylsulfolenyl compounds may be represented by the formulae

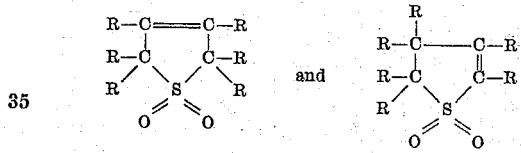

wherein at least one of the R's is a halogen atom, at least one of the R's is the hydroxy radical, at least two of the R's are alkyl radicals, and the remaining R's are members of the group consisting of the hydrogen atom, the hydrocarbon radicals and the substituted hydrocarbon radicals.

A valuable group of cyclic sulfone halohydrins of the invention comprises those compounds containing a five-membered heterocyclic ring consisting of four nuclear carbon atoms and a sulfonyl radical and having two alkyl radicals directly attached to two different nuclear carbon atoms, preferably in the 2- and 4-positions, wherein one of two vicinal nuclear carbon atoms is directly attached to a halogen atom and the other is directly attached to a hydroxy radical, the remaining free bonds of the nuclear carbon atoms being directly attached to hydrogen atoms.

The alkyl radicals which are directly attached to the cyclic sulfone nucleus are preferably lower alkyl radicals containing not more than four carbon atoms, i. e. the methyl, ethyl, propyl, isopropyl, n-butyl, sec-butyl and tert-butyl radicals. However, useful compounds are also formed wherein alkyl radicals containing more than four carbon atoms are directly attached to the cyclic sulfone nucleus. Examples of the higher alkyl radicals are amyl, hexyl, isoamyl, 2-methylamyl, heptyl, octyl, stearyl and the like.

The halogen atoms which may be directly attached to one or more of the nuclear carbon atoms of the cyclic sulfone nucleus may be any halogen atoms, but are preferably chlorine, bromine or iodine atoms, and more preferably chlorine atoms. The polyalkylsulfolanyl and polyalkylsulfolenyl chlorohydrins are of especial value.

The organic radicals which may be directly attached to the nuclear carbon atoms are monovalent radicals which are preferably hydrocarbon or substituted hydrocarbon radicals which may be cyclic or acyclic, saturated, unsaturated or aromatic, such as the alkyl, alkenyl, aryl, alkaryl, alkenaryl, aralkyl, aralkenyl, cycloalkyl, cycloalkenyl and heterocyclic radicals.

The substituted hydrocarbon radicals are preferably those wherein one or more hydrogen atoms of a hydrocarbon radical have been replaced by an inorganic radical such as ammonium, sulfate, sulfite, nitrate, nitrite and halogen. A preferred group of substituted hydrocarbon radicals comprises the halogen-substituted radicals such as chloromethyl, dichloromethyl, 2-chlorobutyl, chloroallyl, bromoallyl, dichlorophenyl, pentachlorophenyl, bromocyclohexyl, chlorocyclohexenyl and the like and their homologues and analogues. The organic radicals which R may represent also include the heterocyclic radicals such as the furfuryl, tetrahydrofurfuryl, thiophenyl, sulfolanyl, sulfolenyl and pyridinyl radicals and the like and their homologues and analogues.

When R represents an organic radical it is preferably a hydrocarbon radical. Suitable hydrocarbon radicals are methyl, ethyl, propyl, isopropyl, butyl, sec-butyl, tert-butyl, amyl, hexyl, cyclohexyl, cyclohexenyl, 3,5,5-trimethyl-2-cyclohexenyl, 3,5,5-trimethyl-3-cyclohexenyl, 3,3,5-trimethylcyclohexyl, vinyl, isopropenyl, allyl, methallyl, crotyl, tiglyl, cinnamyl, phenyl, benzyl, cresyl, xylyl, styryl, naphthyl, cyclopentadienyl, propargyl, and the like and their homologues. The hydrocarbon radicals which may be directly attached to nuclear carbon atoms are preferably of saturated character, i. e. not readily hydrogenatable, such as the alkyl, cycloalkyl, aryl, aralkyl and alkaryl radicals, and are more preferably alkyl radicals. Examples of the saturated hydrocarbon radicals include methyl, ethyl, propyl, isopropyl, butyl, isobutyl, sec-butyl, tert-butyl, cyclohexyl, cyclopropyl, 3,3,5-trimethylcyclohexyl, phenyl, xylyl, benzyl and cresyl.

Polyalkylsulfolanyl monohalohydrins having the halogen atom and the hydroxy radical on the vicinal carbon atoms in the 3- and 4-positions and having an alkyl group on each of the carbon atoms in the 2- and 4-positions of the sulfolane ring, possess unexpectedly valuable properties which make them of particular use in various industrial applications. An example of a particularly valuable 2,4-dialkylsulfolanyl monohalohydrin is 2,4-dimethyl-3-chloro-4-sulfolanol.

The numbering system of the sulfolane or sulfolene ring is indicated below:

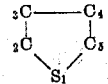

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84. The system may be exemplified by the compound having the structure:

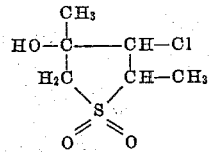

which is termed 2,4-dimethyl-3-chloro-4-sulfolanol. The compound having the structure:

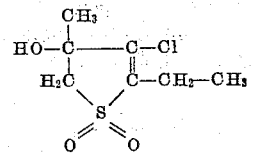

is termed 2-ethyl-4-methyl-3-chloro-2-sulfolen-4-ol.

Halohydrins of the type of 3-chloro-4-sulfolanol are disclosed in the prior art. In these compounds, the sulfolane nucleus has no more than one alkyl radical directly attached to any of the nuclear carbon atoms. Novel compounds have now been prepared wherein the sulfolane or sulfolene nucleus has at least two alkyl radicals directly attached to one or more nuclear carbon atoms. Surprisingly, it has been found that the polyalkylated cyclic sulfone halohydrins of the invention, and particularly the 2,4-dialkylsulfolanyl monohalohydrins and the 2,4-dialkylsulfolenyl monohalohydrins, possess properties and characteristics which make them markedly superior to cyclic sulfone halohydrins containing no alkyl substituents or only one alkyl substituent on the heterocyclic nucleus for many purposes and uses. The marked advantages could not be foreseen, and they are of such a nature as to make the compounds of the invention particularly useful in various applications.

The polyalkylsulfolanyl and polyalkylsulfolenyl halohydrins of the invention may be prepared by any suitable method. A particularly convenient method for the preparation of a polyalkylsulfolanyl monohalohydrin comprises reacting a polyalkylsulfolene such as a 2,4-dialkyl-3-sulfolene with a hypohalous acid such as hypochlorous acid, or with the halogen in the presence of water, for example chlorine water. If desired, a suitable organic solvent may be used which is substantially inert to the reactants and/or products under the conditions of the reaction, and it should be present in amounts sufficient to bring about solution of at least portions of the reactants and/or products but not enough to cause excessive dilution or in any other way to interfere with the reaction. The temperature should be maintained below that temperature at which substantial decomposition of the reactants and/or products results. Generally, a temperature between about 25° C. and about 125° C. is suitable, although higher or lower temperatures may be used in some cases if desired.

When a polyalkyl-2-sulfolene having the double bond between two nuclear carbon atoms one of which is directly attached to the sulfonyl radical, is reacted with the halogen in the presence of water or with the hypohalous acid, a polyalkyl-sulfonanyl monohalohydrin having the halogen atom and the hydroxy group on the carbon atoms in the 2- and 3-positions is produced. When the halogen and water or the hypohalous acid is reacted with a polyalkyl-3-sulfolene, i. e. a sulfolene having the double bond between two nuclear carbon atoms each of which is once removed from the sulfonyl radical, there is formed a polyalkylsulfolanyl monohalohydrin having the halogen atom and the hydroxy group on the carbon atoms in the 3- and 4-positions; for example a 2,4-dialkyl-3-sulfolene reacted with chlorine water produces a 2,4-dialkyl-3-chloro-4-sulfolanol.

The polyalkylsulfolene which is to be halohydrinated is prepared by reacting the corresponding conjugated diene of at least six carbon atoms with sulfur dioxide.

A polyalkylsulfolenyl halohydrin may be produced by reacting sulfur dioxide with the appropriate conjugated diolefinic compound of at least six carbon atoms having one of the unsaturated carbon atoms linked to a halogen atom and having another unsaturated carbon atom linked to a hydroxy radical. A polyalkylsulfolenyl halohydrin may also be prepared by reacting the corresponding polyalkylsulfoldiene with a halogen in the presence of water or with a hypohalous acid; for example 2,4-dimethyl-3-chloro-4-sulfolene-2-ol may be prepared by reacting 2,4-dimethyl-sulfoldiene with chlorine in the presence of water.

A halogenated hydroxy polyalkylsulfolane such as a 2,4-dialkyl-sulfolane having two halogen atoms and two hydroxy radicals directly attached to nuclear carbon atoms of the sulfolane nucleus, may be prepared by reacting the corresponding polyalkylsulfolenyl monohalohydrin with halogen in the presence of water.

The novel halogenated hydroxy polyalkylsulfolanes and polyalkylsulfolenes of the invention find utility in a large variety of industries. For example, the halohydrins may be used as insecticides, fungicides and parasiticides or as ingredients of insecticidal, fungicidal and parasiticidal compositions, and as ingredients for use in the manufacture of varnishes, polishes, and the like. Also, these novel compounds may be employed as antioxidants, pourpoint depressants, extracting agents, ingredients in cosmetics, as base materials and fixing agents in the preparation of perfumes, as softening agents for the leather industry and as selective solvents in extractive distillation processes. The polyalkylated cyclic sulfone halohydrins are of use in the preparation of natural or synthetic rubbers, resins, plastics, etc., and they are of value in the resin and lacquer industry as solvents and plasticizers for the manufacture of dopes, fabric coatings, sprays and moulding compositions. Moreover, the polyalkylsulfolanyl and polyalkylsulfolenyl halohydrins may be further reacted to produce valuable substances to be used as addition agents in lubricating oils, greases, and as detergents, as well as for a variety of other purposes.

The polyalkylsulfolanyl monohalohydrins and more particularly the 2,4-dialkylsulfolanyl monochlorohydrins such as 2,4-dimethyl-3-chloro-4-sulfolanol, are of outstanding value as intermediates in the production of solvents and plasticizers particularly for treating synthetic rubbers to enhance their value for use in the manufacture of tires.

The following examples serve to illustrate the invention.

*Example I*

Into a solution of about 30 parts by weight of 2,4-dimethyl-3-sulfolene in approximately 800 parts by weight of water, about 18 parts by weight of chlorine was bubbled, with stirring and maintaining the temperature at about 40° C. to about 50° C. When addition was complete, the reaction mixture was evaporated by warming under reduced pressure and subsequently distilled to obtain the product boiling at 160° C. to 163° C. at 2 mm. The 2,4-dimethyl-3-chloro-4-sulfolanol which was recovered has a melting point of 110.5° C. to 111.5° C., may be recrystallized from ether and is soluble in water.

*Example II*

Approximately 18 parts by weight of chlorine are slowly bubbled into a solution of about 36 parts by weight of 2,4-diethyl-3-sulfolene in about 800 parts by weight of water while maintaining the temperature at about 85° C. to about 90° C. The 2,4-diethyl-3-chloro-4-sulfolanol is recovered by evaporating the reaction mixture and distilling.

*Example III*

2,4-dimethyl-3-bromo-4-sulfolanol is produced by reacting 2,4-dimethyl-3-sulfolene with bromine in the presence of water according to the procedure described in Example I.

*Example IV*

Following the procedure described in Example I, 2,5-dimethyl-3-sulfolene is reacted with chlorine in the presence of water to obtain 2,5-dimethyl-3-chloro-4-sulfolanol.

*Example V*

2,4-dimethyl-2-sulfolene is reacted with chlorine in the presence of water according to the procedure described in Example I to form 2,4-dimethyl-3-chloro-2-sufolanol.

Following the general procedures outlined above, the following novel compounds are also prepared: 2,4 - diisopropyl-3-chloro-4-sulfolanol, 2,4-dibutyl-3-chloro-4-sulfolanol, 2,4,5-trimethyl-3-chloro - 4 - sulfolanol, 2,4 - dimethyl-5-ethyl-3-bromo - 4 - sulfolanol, 2 - ethyl - 4,5 - dimethyl-3-chloro-4-sulfolanol, 2,4,5-tripropyl - 3 - chloro-4-sulfoanol, 2,4,5,5-tetramethyl - 3 - chloro - 4 - sulfolanol, 2,4,5,5 - tetraethyl-3-bromo-4-sulfolanol, 2,4-diethyl-3-bromo-4-sulfolanol, 2,4-dimethyl-3-bromo-2-sulfolanol, 2,4-diethyl - 3 - chloro-2-sulfolanol, 2,4-diisopropyl-3-chloro-2-sulfolanol and 2,4,5 - trimethyl - 3 - chloro-2-sulfolanol. Other polyalkylated cylic sulfone halohydrins which may be prepared are 2,5-diethyl-3-bromo-4-sulfolanol, 2,5 - dimethyl-3-chloro - 2 - sulfolanol, 2,5,5 - trimethyl-3-chloro - 4 - sulfolanol, 2,5,5-triethyl-3-bromo-2-sulfolanol, 2,4-dimethyl-3-chloro-4-sulfolene-2-ol and 2,5-dimethyl - 3 - chloro - 4 - sulfolene-2-ol.

We claim as our invention:

1. The compound having the structural formula

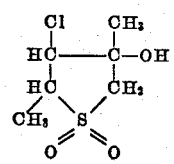

2. The compound having the structural formula

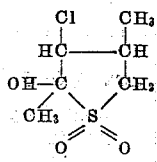

3. A compound having the structural formula

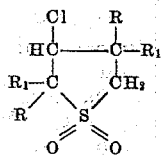

wherein the R's are alkyl radicals, one of the $R_1$'s is a hydroxy radical and the other of the $R_1$'s is a hydrogen atom.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,357,344 | Morris et al. | Sept. 5, 1944 |

OTHER REFERENCES

Backer et al., Rec. Trav. Chim. 58, 781, (1939).